April 15, 1969 W. D. MacGEORGE 3,439,171

PHOTOELECTRIC MEMORY DEVICE IN WHICH THE CURRENT THROUGH THE SOURCE IS INDICATIVE OF THE REMEMBERED SIGNAL

Filed Oct. 20, 1965

INVENTOR.
WILLIAM D. MAC GEORGE

BY M. Michael Carpenter

ATTORNEY.

3,439,171
Patented Apr. 15, 1969

3,439,171

PHOTOELECTRIC MEMORY DEVICE IN WHICH THE CURRENT THROUGH THE SOURCE IS INDICATIVE OF THE REMEMBERED SIGNAL

William D. MacGeorge, Doylestown, Pa., assignor to Honeywell Inc., Minneapolis, Minn., a corporation of Delaware Filed Oct. 20, 1965, Ser. No. 498,429
Int. Cl. G01j 1/32
U.S. Cl. 250—205 6 Claims

ABSTRACT OF THE DISCLOSURE

A memory device is shown having a coil and shutter arranged for rotational movement within a magnetic field. An input signal is applied through the coil to a light source which illuminates a photoelectric cell. The shutter is arranged between the light and photoelectric cell for varying the amount of illumination upon the photoelectric cell when a current is flowing through the coil. The output of the photoelectric cell is applied through an amplifier to the light source for balancing the potential across the light against the input signal potential and thus stopping the current flow within the coil. The output of the memory device is generated across the light source and retained by the light, shutter, photocell, and amplifier during the absence of the input signal.

Figure 1:
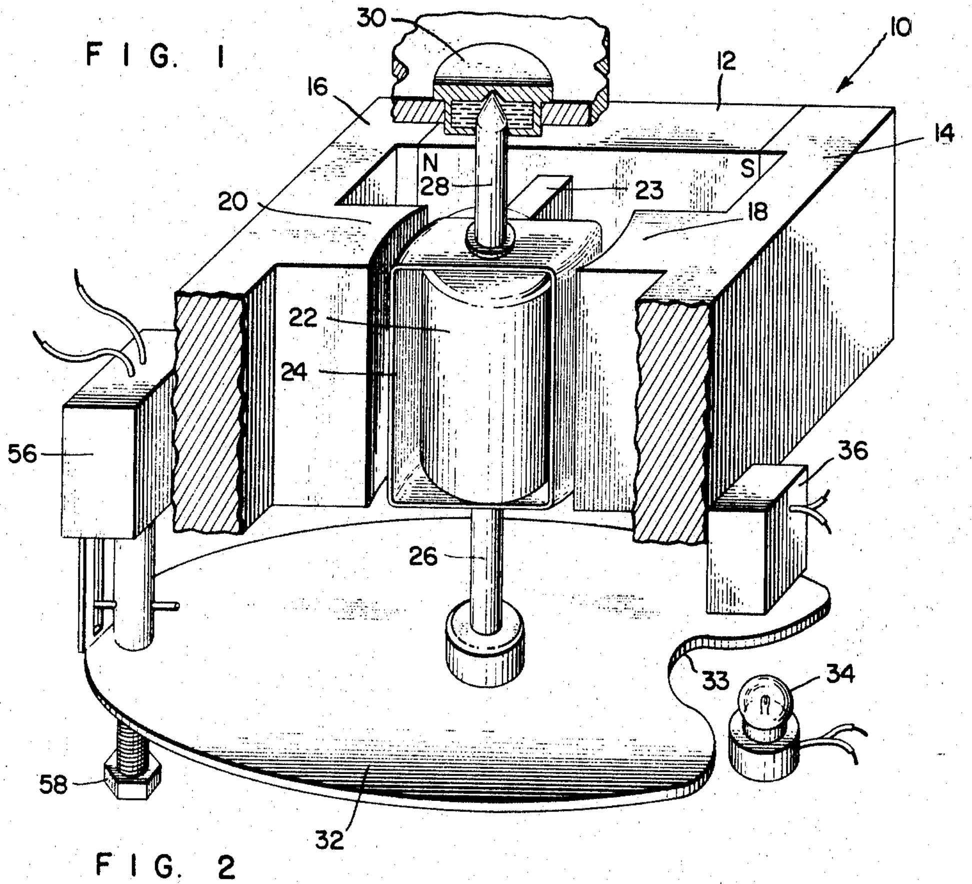

The present invention relates to a memory device and more particularly to an electro-mechanical device that reproduces an input signal received therein for supplying an output signal therefrom and which continues to supply the output signal therefrom, equal to the last received input signal, during the absence of said input signal.

Electronic systems, used for controlling various industrial processes, occasionally require circuit components thereof to be turned off for such purposes as calibration, circuit check, or during periods when one circuit component of the system is being time-shared with other circuit components therein. During the periods when an electrical signal is removed from a circuit component it is often desirable to continue the circuit output signal for insuring a continuation of accurate control over the industrial process which the circuit may be controlling. Pressures of automation and demands for increased accuracy have made it necessary to continually improve the electronic systems, known as process controller, which control industrial processes. One approach toward an improved process controller is to provide a single high quality amplifier which is time-shared between a plurality of circuit components, such as individual control loops. A system embodying such a time-shared amplifier in a process controller is disclosed in patent application Ser. No. 433,875 to William F. Newbold, filed Feb. 19, 1965 and assigned to the common assignee. This arrangement provides a means for utilizing more accurate and precise electronic circuitry while avoiding the increase in production cost usually accompanying such improvements. In order to take advantage of the time-shared principle, each individual control loop must be provided with a memory device which will retain the last received input signal during the time period when the input signal is being applied to other control loops. Accordingly, one object of the present invention is to provide a memory device for electronic systems.

A second object of the present invention is to provide an individual control loop within a time-shared process controller with a memory device.

Another object of the instant invention is to provide a memory device wherein a continuous output signal will be maintained, in the absence of an input signal, which equals the last received input signal.

Still another object of this invention is to provide a means for storing an input signal within a memory unit over an extended period of time without subjecting said input signal to drifting or other variations which are common in electronic memory systems utilizing capacitance means.

A further object of the present invention is to provide a memory device which is compact and reacts quickly for balancing an output signal against an input signal in a true servo null balance arrangement.

Figure 2:
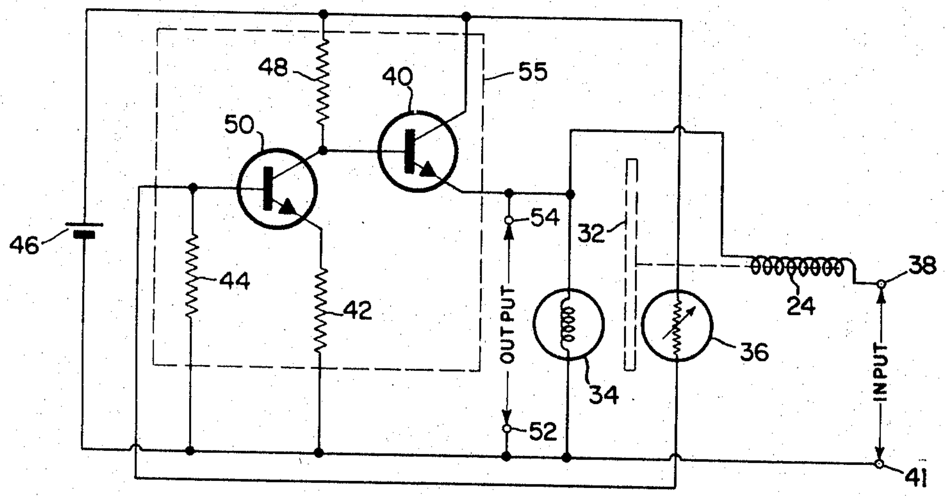

Other objects and many of the attendant advantages of the present invention will become better understood to those skilled in the art when considered in connection with the following detailed specification and drawings, wherein:

FIG. 1 is a perspective view, partially in section, showing the physical arrangement of the basic components of the present invention; and FIG. 2 represents a schematic diagram of one embodiment for carrying out the present invention.

The memory device receives an input signal whose potential is balanced against the output potential across a light source. If a difference exists between the input and output potentials a current is caused to flow through a coil, rotatably mounted within a magnetic field, thereby displacing the coil and a mechanical shutter attached thereto. The displacement of the mechanical shutter varies the amount of light illuminated upon a light sensing means from the light source for causing a change in an output signal from the light sensing means. This change in output signal from the light sensing means is fed into an amplifier for proportionally varying the energization and illumination of the light source and thereby balancing the potential thereacross against the input potential. Since the coil and its associated mechanical shutter are freely mounted within the magnetic field, the removal of an input signal from the input side of the coil will remove all electrical forces acting thereon. The mechanical shutter thereafter remains stabilized within the position it achieved during the last received input signal, until the return of said input signal. A battery, associated with the amplifier and the light source, continues to provide an output potential which equals the last received input potential until the subsequent displacement of the mechanical shutter by the reintroduction of a new input potential.

Referring now to the drawings, and more particularly to FIG. 1 the memory device is shown generally at 10 having a pair of permanently magnetized bar magnets 12, only one of which is shown. Flux return members 14 and 16 abut opposite ends of each bar magnet 12 for forming an outer surface of a cubically-shaped magnetic circuit. A pair of flux concentrating elements 18 and 20 extend inwardly from the inner surface of the flux return members 14 and 16 for establishing and directing the magnetic flux toward a flux return core 22 which is attached to the inner surface of the bar magnetic by a nonmagnetic mounting block 23. Surrounding the flux return core 22 and rotatably positioned within the air gap created between said flux return core 22 and the flux concentrating elements 18 and 20 is a rectangular coil member 24. A pair of supporting shafts 26 and 28 extend vertically from the upper and lower surfaces of the rectangular coil 24 and terminate in mercury filled bearing 30 for providing the rotational freedom of the coil. The mercury bearing material is retained within the bearings 30 by surface tension and provides a secondary function of establishing an electrical contact between the bearings and the coil 24, through the shafts 26 and 28. A mechanical shutter 32, in the form of a disk, is attached to the lower shaft 26 by a press fit and is notched at 33 for providing a means for varying the amount of light passing thereby. The mechanical shutter 32 may be constructed from a photographic film disk and its notch is characterized to provide a means for balancing the electric potential between the coil 24 and a light source 34 in a manner to be described hereinafter. The light source 34 is located below the mechanical shutter 32 and aligned in parallel relation with the notch 33 and a light sensing means 36. In the preferred embodiment the light sensing means 36 is a photoelectric cell of the photoresistive type.

Referring to FIG. 2, one terminal of the coil 24 is attached to an input terminal 38 while its second terminal is attached to a first terminal of the light source 34 and the emitter of a transistor 40. The mechanical shutter and its physical attachment to the coil 24 is shown generally by dotted lines at 32. The second terminal of light source 34 is connected to a second input terminal 41. Resistors 42 and 44 and the negative terminal of a battery 46 are connected to the junction between the input terminal 41 and the light source 34. The positive terminal of battery 46 is connected to the collector of the transistor 40. Connected between the positive terminal of the battery 46 and the collector of transistor 40 is a resistor 48 which connects to the base of the transistor 40 and the collector of a second transistor 50. The resistor 42 connects the junction between the second terminal of light source 34 and a negative terminal of battery 46 to the emitter of the transistor 50 while the resistor 44 joins the same junction to the base of the transistor 50. The collector of transistor 40 is connected to the first terminal of the photoelectric cell 36 while the second terminal thereof is connected to the base of the transistor 50. A first output terminal 52 is connected to the junction between the second terminal of the light source 34 and the negative terminal of the battery 46 while a second output terminal 54 connects between the first terminal of light source 34 and the emitter of transistor 40. The transistors 40 and 50 and their associated resistors 42, 44, and 48 form an amplifier 55 which receives an output signal from the photoelectric cell 36 for causing the energization and illumination of the light source 34 to vary in response to said output signal. The combination of the amplifier 55 and the battery 46 provides a feedback signal means for producing an output potential in the absence of an input potential.

An input signal potential may be applied across the input terminals 38 and 41 from a suitable external source not shown. When the memory device of the present invention receives its input signal from a time-shared amplifier of a continuous process controller, the amplifier is sequentially connected to and disconnected from the input terminals 38 and 41 by a suitable switching arrangement, not shown. An example of such a switching arrangement is shown in the Newbold patent application, Ser. No. 433,875, referred to hereinabove.

In operation the potential across the input terminals 38 and 41 is compared with the potential across the light source 34 and the output terminals 52 and 54. In the absence of a differing potential therebetween there is no current flow within the coil 24 and, consequently, there is no displacement of the coil 24 within the established magnetic field for displacing the mechanical shutter 32 and its associated notch 33. Upon an increase of the input potential, a current flows through the coil 24 thereby creating a magnetic flux within the coil for causing a deflection of that coil, due to the presence of the magnetic field within which the coil is mounted. The deflection of the coil 24 is accompanied by a similar rotation of mechanical shutter 32 whose characterized notch 33 acts to decrease the amount of illumination between the light source 34 and the photoelectric cell 36. The decreased illumination between the light source and the photoelectric cell thereby increases the resistance of the photoelectric cell 36 for decreasing the amount of current applied to the amplifier 55. The decreased conductivity to the amplifier 55 partially reduces the potential on the base of the transistor 50 thereby proportionally turning off that transistor and increasing the potential applied to the base of the transistor 40. When the potential increases at the base of the transistor 40 that transistor is turned on and becomes proportionally more conductive for increasing the output of the amplifier 55. The increased amplifier output thus increases the energization of the light source 34 and, consequently, the illumination thereof. As the illumination falling on the photoelectric cell 36 increases, the resistance of the cell stops changing and the output of the amplifier 55 becomes stabilized for balancing the potential across the light source against the input signal potential in a true servo null balance. When these potentials are balanced, it will be seen that a current will no longer flow through the coil 24, causing it to become stationary within the magnetic field. Upon removal of the input potential, the coil and mechanical shutter remains stabilized within the magnetic field, due to the absence of external forces acting thereupon. The battery 46 and amplifier 55 provide a feedback signal to the light source 34 for maintaining the output potential equal to the last removed input potential, until the reintroduction thereof.

Should the input potential decrease, the balance across the coil will be again disturbed for causing current to flow in an opposite direction through the coil 24. The coil 24 and the mechanical shutter 32 are then displaced in a direction opposite to that described hereinabove for causing an increase of the light illumination upon the photoelectric cell 36. In this event, the circuit will respond in a manner opposite that described hereinbefore and the potential across the light source 34 will drop proportionally to balance the input potential. The mechanical shutter 32 is characterized and the values of the circuit components chosen to establish a potential cross the light source which equals the minimum input potential when the mechanical shutter is positioned for allowing a maximum illumination of the photoelectric cell 36 by the light source 34.

When the interval of time during which the memory device is required to memorize a previous input signal becomes an extended one, or one in which excessive vibrations occur, a solenoid brake 56 and a stop 58 may be supplied to lock the mechanical shutter 32 into place. The solenoid brake could also be constructed in the form of a pair of pincher arms which, when the solenoid is energized, clamp the mechanical shutter 32 from each side in a scissor-like arrangement.

In the preferred embodiment of the present invention the memory device is utilized in conjunction with a time-shared amplifier and a process controller, however, it should not be limited to this application. For example, the memory device may be used within electronic equipment requiring frequent calibration or checking where it is desirable to continue the output signal therefrom during these frequent periods. By utilizing the memory device the electronic eqipment may retain the last received input signal while undergoing calibration and then be returned to its task without experiencing an interruption of its output signal.

Obviously, many other modifications and variations of the present invention are possible in light of the above teachings; and it should be undertood that the embodiment described hereinabove is an illustration rather than a limitation. Consequently, the present invention should be limited only by the appended claims.

What is claimed is:

1. A memory device having a pair of input terminals across which an input signal potential is applied and a pair of output terminals for use within an electronic system comprising, means for establishing a magnetic field, a light source, coil means rotatably disposed within said field and connected between one input terminal and said light source, light sensing means for receiving illumination from said light source thereby producing a signal proportional thereto, mechanical shutter means attached to said coil means and disposed between said light source and said light sensing means for varying said illumination therebetween, amplifier means for receiving said proportional signal from said light sensing means and feeding said signal to said light source for varying the energization and illumination thereof and thereby establishing a balanced condition between said input signal potential and the potential across said light source, said output terminals connected across said light source for establishing an output potential thereacross, whereby, notwithstanding removal of said input signal potential, said coil and mechanical shutter means stabilize for maintaining said output potential across said light source until reintroduction of said input signal potential.

2. A memory device as described in claim 1 additionally comprising brake means wherein the removal of said input potential causes said brake means to lock said mechanical shutter means in a stabilized position.

3. A memory device as described in claim 2 wherein said coil means are rotatably mounted within mercury filled bearings.

4. A memory device as described in claim 3 wherein said means for establishing a magnetic field include a pair of permanent magnets, flux return members joining said magnets into a cubically-shaped structure having a pair of inwardly directed elements for concentrating said flux, and a flux return core attached to said cubically-shaped structure around which said coil means is rotatably disposed.

5. A memory device having a pair of input and a pair of output terminals for use within an electronic system comprising, means for establishing a magnetic field, rotatable coil means disposed within said field having a pair of terminals with one of said terminals connected to one of said input terminals, a light source having a first terminal connected to a second terminal of said coil means and a second terminal thereof connected to a second terminal of said pair of input terminals, light sensing means for receiving illumination from said light source thereby producing a signal proportional thereto, mechanical shutter means attached to said coil means and disposed between said light source and said light sensing means for varying the illumination therebetween, amplifier means including input and output terminals having an output terminal connected to said first terminal of said light source and an input terminal connected to said light sensing means for receiving said proportional signal therefrom, energy means having a first terminal connected to said second terminal of said light source and a second terminal connected to said amplifier means and said light sensing means for providing energy thereto, and said pair of output terminals of said memory device connected across said light source, whereby a change in a signal potential applied to said input terminals unbalances the potential between said input and output terminals thus deflecting said coil means and said mechanical shutter means for varying said illumination received by said light sensing means and thereby varying the signal therefrom for varying said light source energization and illumination and balancing the output potential across said light source against the input signal potential, and wherein, notwithstanding removal of said input potential, said coil and mechanical shutter means stabilize for maintaining said output potential until reintroduction of said input potential.

6. A memory device for retaining an output signal potential across a pair of output terminals after an input signal potential has been removed from across a pair of input terminals, comprising, means for establishing a magnetic field, means responsive to said magnetic field rotatably disposed within said field, a light source serially connected with said means responsive to said magnetic field wherein said means responsive to said magnetic field and said light source are connected across said input terminals, light sensing means for receiving illumination from said light source and for producing a signal proportional thereto, said means responsive to said magnetic field disposed between said light source and said light sensing means for varying said illumination therebetween, amplifying means having an input connected to said light sensing means and an output connected to said light source, and said output terminals connected across said light source, wherein a change in said input signal potential moves said means responsive to said magnetic field for varying the illumination falling upon said light sensing means and applying a resilient change in potential to said light source and said output terminals which balances said changing input signal potential, and wherein removal of said input signal potential stabilizes said means responsive to said magnetic field for retaining said output signal potential until reintroduction of said input signal potential.

References Cited

UNITED STATES PATENTS

| | | | |
|---|---|---|---|
| 1,754,085 | 4/1930 | Faus | 324—151 |
| 2,649,834 | 8/1953 | Sweet | 315—151 |
| 3,068,408 | 12/1962 | Lovegrove | 250—205 X |

JAMES W. LAWRENCE, *Primary Examiner.*

E. R. LA ROCHE, *Assistant Examiner.*

U.S. Cl. X.R.

250—217, 237; 315—151, 158; 324—96